E. B. McCoy,
Bench Dog,
No. 77,998.   Patented May 19, 1868.

Witnesses:
A. J. Tibbits
J. H. Shumway

Inventor:
E. B. McCoy,
By his Attorney,
John E. Earle

United States Patent Office.

E. B. McCOY, OF WINSTED, CONNECTICUT, ASSIGNOR TO HIMSELF AND R. COOK AND SONS, OF SAME PLACE.

*Letters Patent No. 77,998, dated May 19, 1868; antedated May 4, 1868.*

IMPROVEMENT IN CARPENTERS'-BENCH DOG.

*The Schedule referred to in these Letters Patent and making part of the same.*

TO ALL WHOM IT MAY CONCERN:

Be it known that I, E. B. McCoy, of Winsted, in the county of Litchfield, and State of Connecticut, have invented a new Improvement in Joiners'-Bench Hook; and I do hereby declare the following, when taken in connection with the accompanying drawings, and the letters of reference marked thereon, to be a full, clear and exact description of the same, and which said drawings constitute part of this specification, and represent, in—

Figure 1:
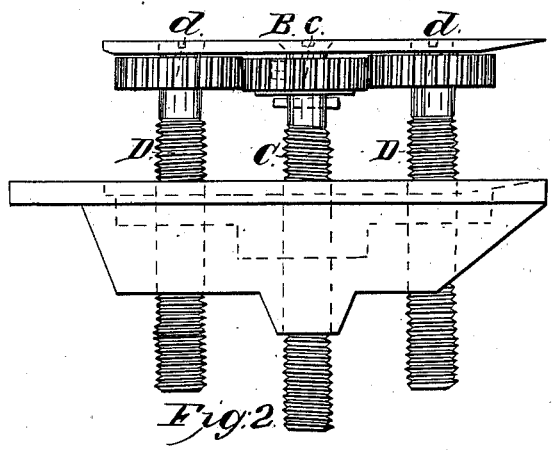

Figure 1, a side view, and in

Figure 2:
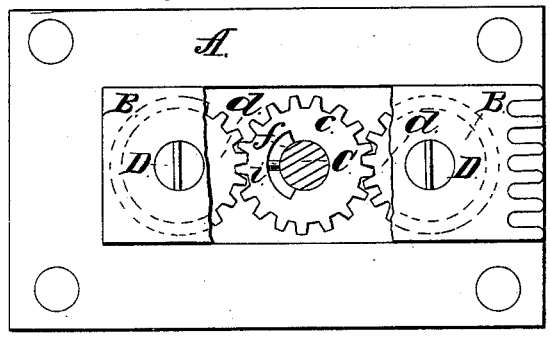

Figure 2 a top view, a portion of the hook broken away, to show the internal arrangement.

This invention relates to an improvement in the hook or stop used by joiners and other workers in wood at the head of the bench, and against which the wood to be wrought is set, its object being to adjust and set the hook at any desired height, according to the thickness of the wood to be wrought, and consists in the arrangement of right and left-hand screws, so that by turning the one the hook will be raised, and the other, the hook will be lowered, and by reversing the movement of the screw so turned, when set at the proper height, the hook will be firmly locked in that position.

To enable others to construct and use my improvement, I will proceed to describe the same, as illustrated in the accompanying drawings.

A is the plate, which is set and fixed into the bench, and has formed in its surface a recess, into which the hook B will set flush with the surface of the plate. C is a left-hand screw, and D D right-hand screws, each working through the plate A, as seen in fig. 1. The centre or left-hand screw is secured to the hook B, as seen in fig. 1, but so as to be turned freely in its bearing. The upper ends of the other two screws also have bearings in the hook B, as seen in fig. 1, and the upper ends of the three screws are slotted, as denoted in fig. 1, and upon each of the screws are arranged gears $c$ and $d\ d$, so that the three screws are moved together.

The wheel upon the centre screw is loose upon the screw, so as to permit the screw to be turned partially around without moving the said gear. This is done by forming a groove, $f$, in the upper surface of the centre gear, $c$, and fixing a pin, $i$, in the shaft of the screw C, which lies in the said groove, so as to permit the turning of the said screw within the limits of the said screw without moving the gear $c$.

The operation of the hook is as follows: To raise the hook, place an ordinary screw-driver in the slot of the centre screw, and turn it in the direction to raise the hook; the pin $i$ will strike the end of the groove $f$, and cause the revolution of the three screws, and the hook will continue to rise so long as the centre screw is so turned; and when raised to the proper height, reverse the movement of the centre screw, which turns the said centre screw down, the pin $i$ returning in the groove $f$, the other two screws remaining stationary, and the centre screw draws down and firmly binds the hook before the pin $i$ reaches the other extreme of the groove $f$, and thus holds it in the required position.

To lower the hook, place the screw-driver in the slot of either of the other screws D, and turn in the direction to lower the hook, the centre gear communicating motion to the other two screws, the end of the groove $f$ striking and causing the centre screw to lower. To fix the hook in the lowered position, reverse the movement of the screw-driver to turn the screw D in the opposite direction; the centre gear $c$ will turn without moving its screw, and thus the hook will be bound as before. Thus the centre screw forms, as it were, a jam or binding-screw.

I have represented the centre screw as a left-hand, and the two outer screws as right-hand. These may be reversed, and the outer screw be made left-hand, while the centre screw is right-hand.

It is not positively necessary that three screws be employed, as but a single right and a single left, arranged so as to bind together in the manner described, will accomplish the result, but not in so satisfactory a manner as the three screws.

Having thus fully described my invention, what I claim as new and useful, and desire to secure by Letters Patent, is—

The screw C, arranged with its gear $c$, and combined with one or more screws, D, of reverse threads, so as to operate together, and the one to bind the other, substantially as herein set forth.

E. B. McCOY.

Witnesses:
M. W. DOUGLAS,
JOHN H. KINNEY.